United States Patent [19]

Hirami et al.

[11] Patent Number: 4,903,233
[45] Date of Patent: Feb. 20, 1990

[54] WORD PROCESSOR HAVING CAPABILITY OF CONTINUOUSLY ENTERING DOCUMENTS INTO A COLUMN OR A BLOCK OF AN EDITING SYSTEM

[75] Inventors: Akira Hirami; Yasuhiro Taguchi, both of Nara, Japan

[73] Assignee: Sharp Kabushiki Kaisha, Osaka, Japan

[21] Appl. No.: 64,053

[22] Filed: Jun. 19, 1987

[30] Foreign Application Priority Data

Jun. 20, 1986 [JP] Japan ................. 61-145950
Jun. 20, 1986 [JP] Japan ................. 61-145951
Jun. 20, 1986 [JP] Japan ................. 61-145952

[51] Int. Cl.⁴ .................... G06F 3/12; G06F 3/14; G06F 3/153; G06F 13/00
[52] U.S. Cl. .................... 364/900; 364/943.43; 364/943.44
[58] Field of Search ... 364/200 MS File, 900 MS File; 400/63, 64, 76, 83, 279

[56] References Cited

U.S. PATENT DOCUMENTS

| | | |
|---|---|---|
| 3,618,032 | 11/1971 | Goldsberry et al. |
| 4,047,243 | 9/1977 | Dükstra ................ 364/200 |
| 4,086,660 | 4/1978 | McBride ............... 364/900 |
| 4,240,075 | 12/1980 | Bringol ................ 340/798 |
| 4,334,286 | 6/1982 | Kerigan et al. ........ 364/900 |
| 4,412,294 | 10/1983 | Watts et al. ........... 364/518 |
| 4,506,343 | 3/1985 | Shipp, Jr. et al. ...... 364/900 |
| 4,688,167 | 8/1987 | Agarwal ............... 364/200 |
| 4,739,477 | 4/1988 | Barker et al. .......... 364/300 |

FOREIGN PATENT DOCUMENTS 0094494 11/1983 European Pat. Off.
0173124 3/1986 European Pat. Off.

OTHER PUBLICATIONS

"Practical Tequiniques in MS Word", pp. 193-210, Alan Neibauer, Mar. 1986.
Proceedings of COMPCON '84, the Small Computer (R)Evolution Article Entitled "An Office Work System with a More Friendly User Interface for Document Editing".

Primary Examiner—Archie E. Williams, Jr.
Assistant Examiner—Ayni Mohamed
Attorney, Agent, or Firm—Birch, Stewart, Kolasch & Birch

[57] ABSTRACT

An editing system for use in a word processor includes a letter code producer for sequentially producing letter codes, a document memory having a plurality of memory elements aligned in vertical and horizontal directions with each memory element capable of storing one letter code, and an arrangement for setting vertical and horizontal boundaries within the document memory to divide the document memory into a plurality of columns or blocks, each column or block, having a plurality of lines, and different priorities being assigned to the columns or block. A column buffer is provided for storing line addresses from top to bottom in each of the columns or blocks and in the order of columns or blocks having a higher priority, and an address data producer is provided for sequentially producing address data of the memory elements in each line and in the order of lines as stored in the column buffer. A CPU is provided for controlling the depositing of the letter codes from the letter code producer to the document memory in compliance with the address data produced from the address data producer.

3 Claims, 7 Drawing Sheets

WORD PROCESSOR HAVING CAPABILITY OF CONTINUOUSLY ENTERING DOCUMENTS INTO A COLUMN OR A BLOCK OF AN EDITING SYSTEM

BACKGROUND OF THE INVENTION

1. Field of the invention

The present invention relates to a word processor and, more particularly, to a column or block editing system used in the word processor.

2. Description of the Prior Art

Referring to FIG. 7, an example of a multi-column text prepared according to the prior art column or block editing system is shown. In FIG. 7, a display device 12 has a screen 12a of a CRT (not shown) which is divided into columns or blocks 21, 22, 23, 24 and 25 by horizontal lines 32a and 32b and vertical lines 31a and 31b. After columns the blocks are prepared, a document may be typed in each block using the keys on the keyboard. In the word processor, the block layout is stored and, thereafter, the documents input in the corresponding blocks are stored in the corresponding areas.

In the prior art column or block editing system, the columns or blocks, as well as the documents typed therein, are stored separately, i.e., with no relationship between columns or blocks, so that when the column or block is filled, the document can not be entered any further unless the cursor is moved to another column or block. For example, in block 21, a document can be typed from position 21a to position 21b. When the document is typed down to position 21b, a further typed document can not be entered, unless the operator manually moves the cursor from position 21b to a position in another column or block, such as to position 22a in block 22.

Therefore, according to the prior art column or block editing system, it is not only a time consuming task to make documents in columns or blocks, but also there is such a disadvantage that a lengthy document which has been previously typed and stored in a memory area can not be moved and accommodated in a number of columns or blocks automatically.

SUMMARY OF THE INVENTION

The present invention has been developed with a view to substantially solving the above described disadvantages and has for its essential object to provide a word processor having an improved column or block editing system which can, when one column or block is filled, continuously enter the document in another column or block without manually moving the cursor.

It is also an essential object of the present invention to provide a word processor of the above described type which can skip one or more columns or blocks while entering a lengthy document in a plurality of columns or blocks so as to enable the insertion of an illustration or some other document in the skipped column or block.

In accomplishing these and other objects, a word processor according to the present invention comprises a letter code producer for sequentially producing letter codes, a document memory having a plurality of memory elements aligned in vertical and horizontal directions with each memory element capable of storing one letter code, and an arrangement for setting vertical and horizontal boundaries within the document memory to divide the document memory into a plurality of columns or blocks, each column or block having a plurality of lines, and different priorities being assigned to the columns or blocks. A column buffer is provided for storing line addresses from top to bottom in each of the columns and in the order of columns or blocks having a higher priority, and an address data producer is provided for sequentially producing address data of the memory elements in each line and in the order of lines as stored in the column buffer. A CPU is provided for controlling the depositing of the letter codes from the letter code producer to the document memory in compliance with the address data produced from the address data producer.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other objects and features of the present invention will become apparent from the following description taken in conjunction with a preferred embodiment thereof with reference to the accompanying drawings which are given by way of illustration only, and thus are not limitative of the present invention and, throughout which like parts are designated by like reference numerals, and in which.

DESCRIPTION OF THE PREFERRED EMBODIMENTS

Figure 2:
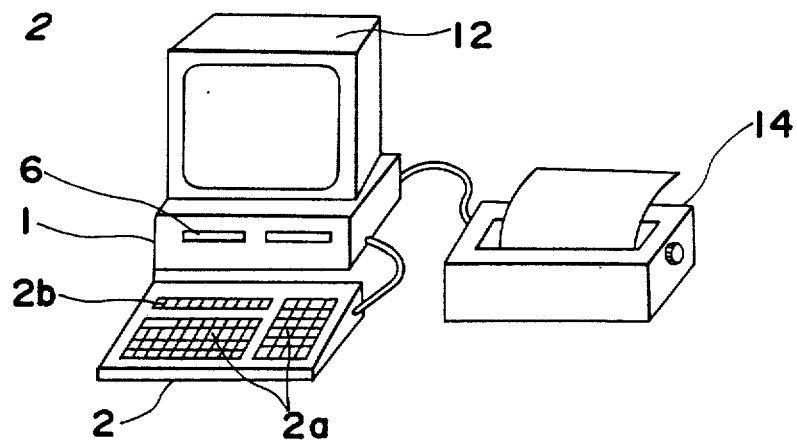
FIG. 2 is a perspective view of a word processor employing the column or block editing system of the present invention.

Referring to FIG. 2, a perspective view of a word processor is shown which has a column or block editing system, according to one preferred embodiment of the present invention. In FIG. 2, a reference number 1 designates a system unit having an external or auxiliary storage 6 defined, for example, by a diskette (floppy disk) drive. System unit 1 is connected to a keyboard 2, a CRT display 12 and printer 14. Keyboard 2 has letter keys 2a for typing letters and function keys 2b for effecting various functions which will be described later.

Figure 3:
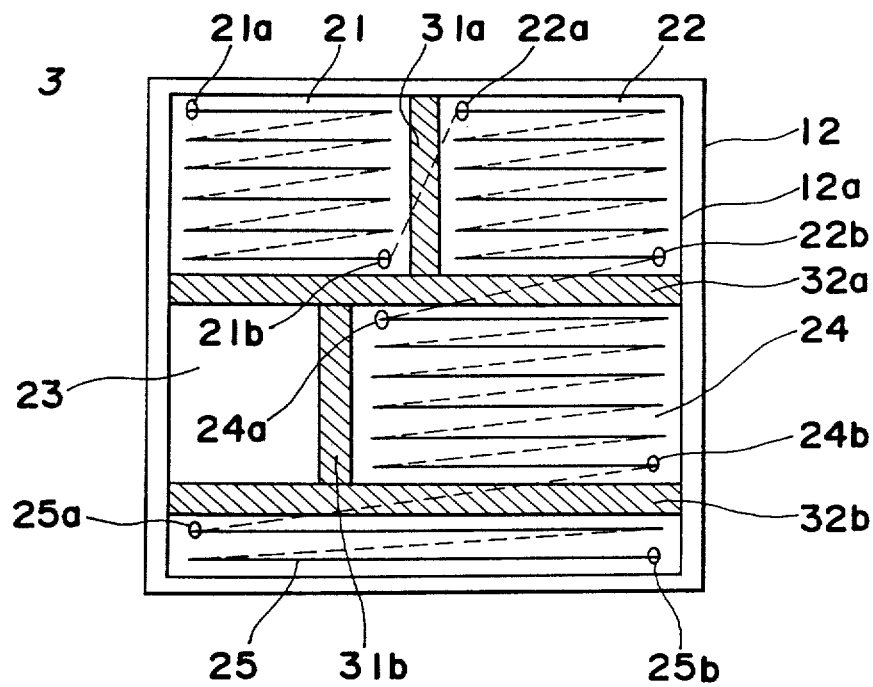
FIG. 3 is a plan view of a screen divided into a number of blocks with an indication of letter depositing order according to the present invention.
Figure 7:
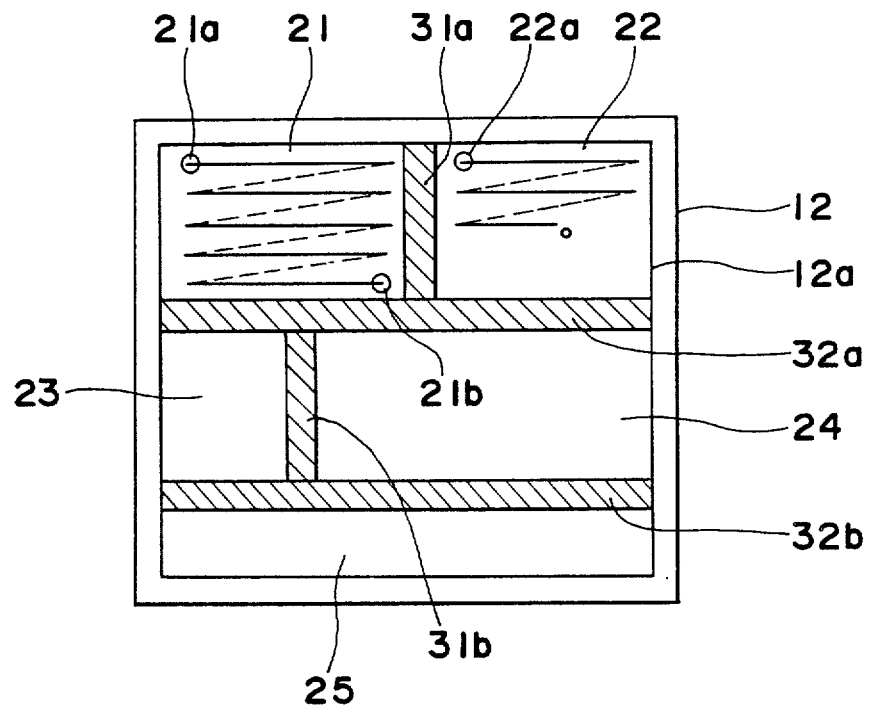
FIG. 7 is a plan view of a screen divided into a number of blocks with an indication of letter depositing order according to prior art.

Referring to FIG. 3, a front elevational view of a screen 12a of CRT display 12 of the word processor of FIG. 2 is shown, particularly illustrating the a multicolumn editing function. Similar to FIG. 7, screen 12a of CRT display 12 of FIG. 3 has vertical boundaries (also indicated as V-boundaries) 31a and 31b, and horizontal boundaries (also indicated as H-boundaries) 32a and 32b so as to divide screen 12a into five blocks 21, 22, 23, 24 and 25. As shown in FIG. 3, V-boundary 31a or 31b divides the screen 12a vertically, so that on both sides of V-boundary 31a or 31b, blocks 21 and 22 or blocks 23 and 24 are provided. Similarly, H-boundary 32a or 32b divides the screen 12a horizontally so as to provide blocks above and below the horizontal line. For example, above the H-boundary 32a and on both sides of V-boundary 31a, blocks 21 and 22 are formed, and between H-boundaries 32a and 32b and on both sides of V-boundary 31b, blocks 23 and 24 are formed, and below the H-boundary 32b, block 25 is formed.

By forming blocks 21–25 on screen 12a, corresponding blocks 21–25 are defined on a document memory 9, which will be described later. As the operator types a document using keyboard 2 in each of blocks 21–25 on screen 12a, the typed document data will be stored in the corresponding blocks 21–25 of the document memory 9. As will be described later, at least one of the blocks 21–25 may be designated as an input inhibit block. When a block is designated as an input inhibit block, in a manner which will be described later, no document data can be inputted in the input inhibit block in the screen, as well as in the document memory 9. For example, when block 23 is designated as the input inhibit block, a continuous input can be effected between blocks 21 and 22, between blocks 22 and 24, and between blocks 24 and 25.

In FIG. 3, horizontal solid lines represent letters aligned horizontally, and dotted lines represent returns and continuous inputs. Therefore, when a lengthy document is typed continuously through keyboard 2 and when, a latter is typed after the last letter at position 21b in block 21 this letter will automatically be displayed at a starting position 22a of block 22. Similarly, when the last position 22b of block 22 is typed, the next typed letter will be displayed at the beginning position 24a of block 24, skipping block 23. Also, when the last position 24b of block 24 is type, the next typed letter will be displayed at the beginning position 25a of block 25. The document as drafted in each of blocks 21, 22, 24 and 25 is stored in document memory 9 in the corresponding blocks, as will be described later.

Figure 4:
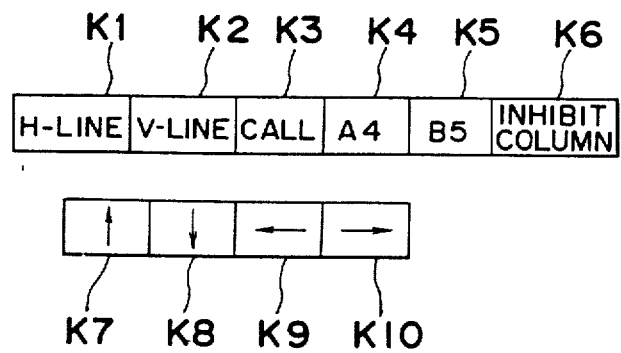
FIG. 4 is a plan view of function keys used for the column or block editing system of the present invention.

Referring to FIG. 4, a plan view of a portion of the functions keys 2b on key board 2 of the word processor is shown. In FIG. 4, function keys K1–K10 which are essential for the column or blocks editing are shown. In FIG. 4, K1 is a horizontal line setting key for setting the horizontal boundary, K2 is a vertical line setting key for setting the vertical boundary, K3 is a call key for calling the document which should be drafted on screen 12a, K4 is an A4 key for setting the format applicable for the A4 size paper, K5 is a B5 key for setting the format applicable for the B5 size paper, K6 is an input inhibit column key for designating a column, columns, block or blocks which is not permitted to input any document, K7–K10 are keys for moving cursor on the screen in the indicated directions.

Figure 1:
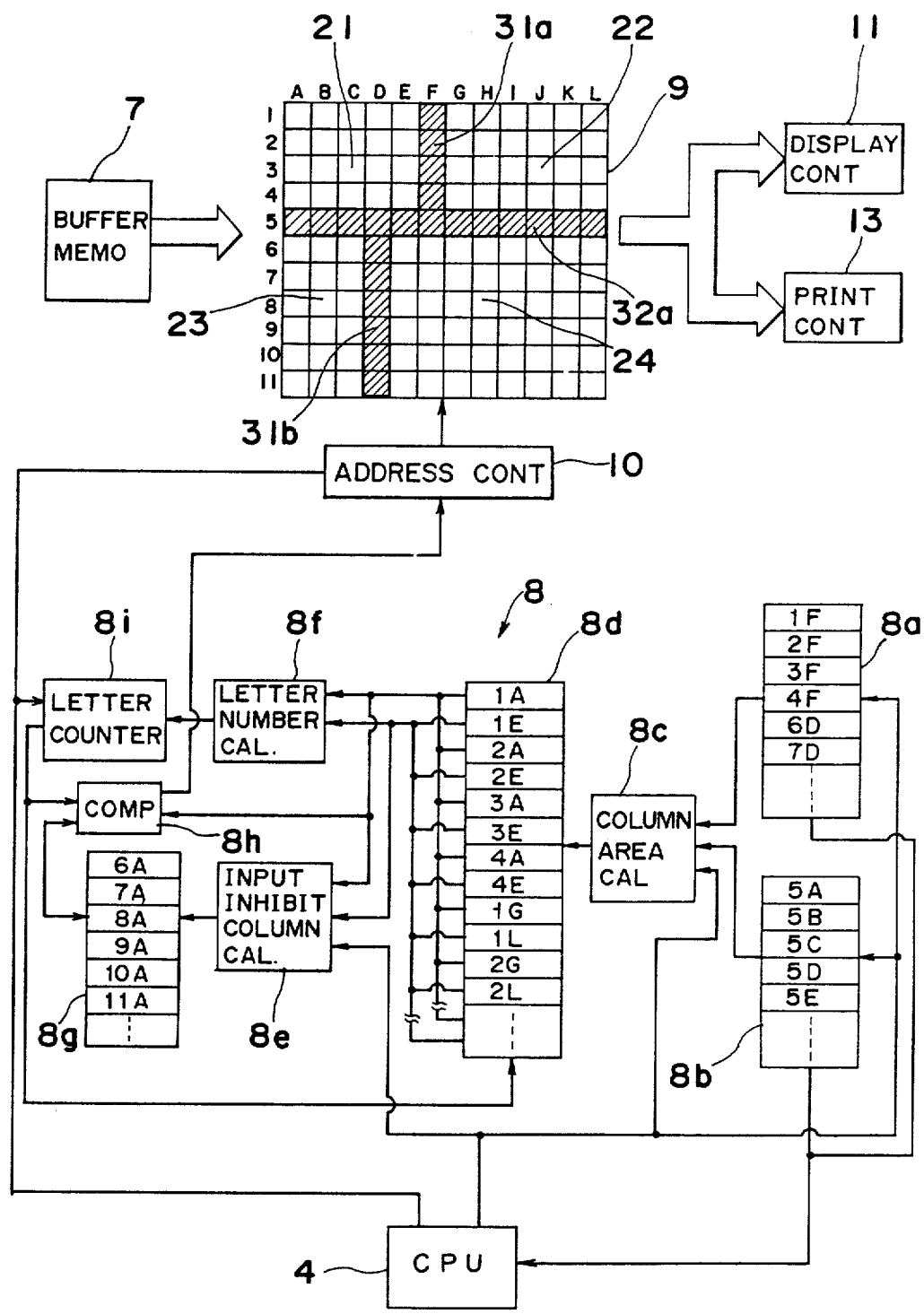
FIG. 1 is a diagrammatic view of a column or block editing system used in the word processor, according to the present invention.
Figure 5:
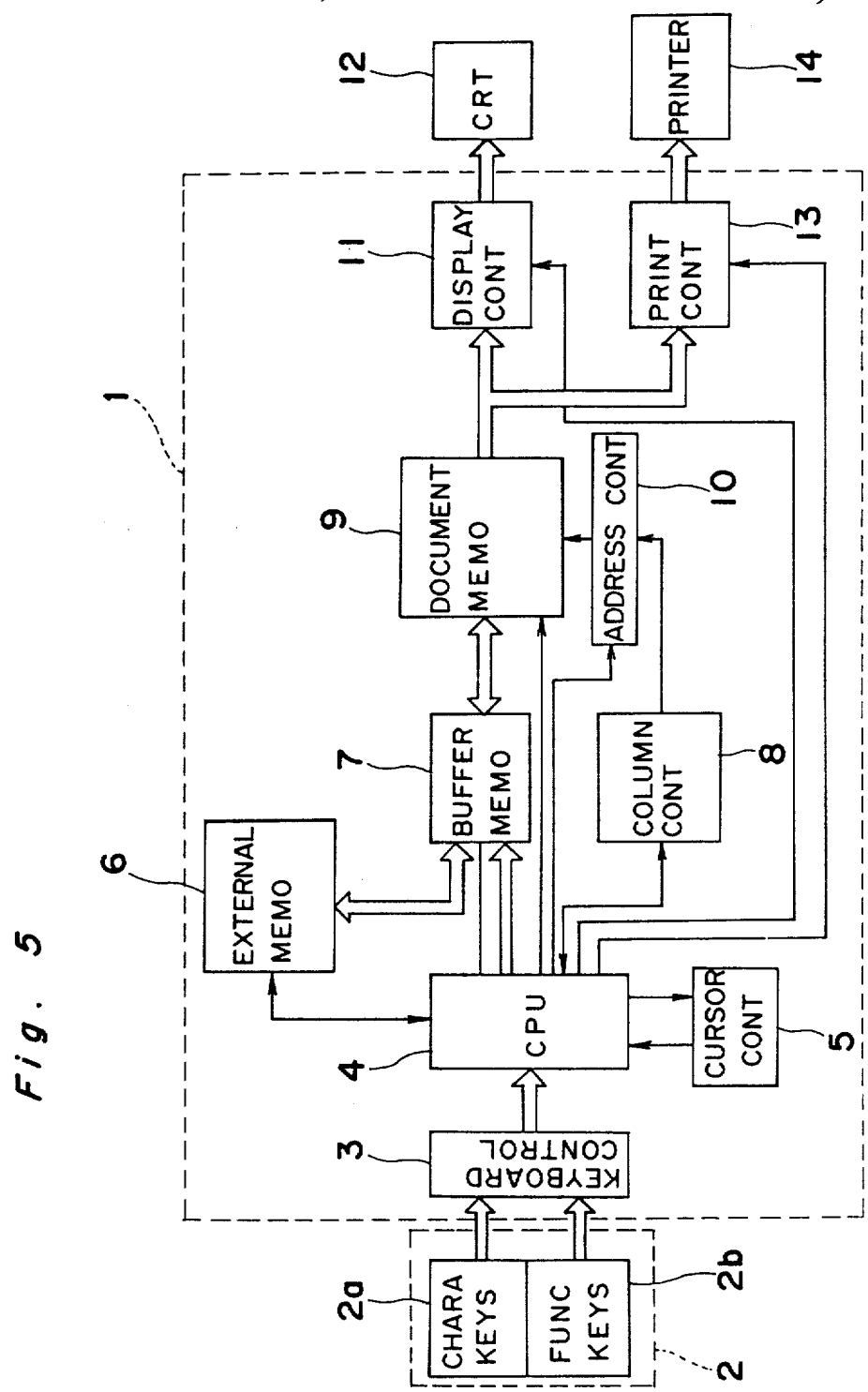
FIG. 5 is a block diagram of a word processor provided with the column or block editing system of the present invention.

Referring to FIG. 5, a block diagram of a word processor of FIG. 1 is shown. In FIG. 5, like parts shown in FIGS. 1–4 are designated by like reference numerals.

In FIG. 5, letter keys 2a and function keys 2b on the keyboard are both connected to a keyboard control circuit 3 provided in system unit 1, so that the key codes representing the typed letter keys and special function keys are inputted to keyboard control circuit 3.

Keyboard control circuit 3 converts the key codes to corresponding letter codes and control codes which are then applied to a main control device formed by a CPU (central processing unit) 4. In addition to the accommodation control of the document in the column, CPU 4 also governs other document editing controls so that CPU 4 is connected to cursor control circuit 5, external memory 6, buffer memory 7, column control circuit 8, document memory 9, address control circuit 10, display control circuit 11 and print control circuit 13, each of which will be described in detail later.

Cursor control circuit 5 has an H-counter for counting the cursor movement in the horizontal direction and a V-counter for counting the cursor movement in the vertical direction. Each counter has maximum and minimum available numbers and is set at a number between the maximum and minimum available numbers. Upon depression of any one of the cursor shifting keys K7–K10 (FIG. 4), the control code corresponding to the depressed key is applied from keyboard control circuit 3 to CPU 4, and thereupon, the H-counter and/or V-counter counts up or counts down. Also, when A4-key K4 (FIG. 4) is depressed, the control code corresponding to the depressed key is applied from keyboard control circuit 3 to CPU 4 and further to cursor control circuit 5. In this case, cursor control circuit 5 changes the maximum available number of the H-counter to forty, and changes the maximum available number of the V-counter to thirty-four. The minimum available number of each of the H-and V-counters is always set at zero. The maximum "forty" as set in the H-counter and the maximum "thirty-four" as set in the V-counter indicate that thirty-four lines, each line containing forty letters, can be printed on an A4 size paper. Similarly, when B5-key K5 (FIG. 4) is depressed, the control code corresponding to the depressed key is applied from keyboard control circuit 3 to CPU 4 and further to cursor control circuit 5. In this case, cursor control circuit 5 changes the maximum available number of the H-counter to thirty-five, and changes the maximum available number of the V-counter to twenty-eight. The maximum "thirty-five" as set in the H-counter and the maximum "twenty-eight" as set in the V-counter indicate that twenty-eight lines, each line containing thirty-five letters, can be printed on a B5 size paper.

The above layout formats are given merely as examples, and are particularly designed for the Japanese language. Other formats can be used for other languages.

External memory 6 is formed, for example, by a floppy diskette drive device and is provided for storing the input document as controlled by CPU 4. The document data is controlled between external memory 6 and buffer memory 7. Buffer memory 7 is connected to CPU 4, external memory 6 and document memory 9, and is provided for temporarily storing the data from the connected circuits. For example, the document data as inputted through keyboard 2 is applied through keyboard control circuit 3 and CPU 4 to buffer memory 7 at which the document data is temporarily stored and is further distributed to external memory 6 or document memory 9. Also, the document data previously stored in external memory 6 is temporarily stored in buffer memory 7 and is further transmitted to document memory 9. Similarly, the document data as stored in document memory 9 is temporarily stored in buffer memory 7 and is further transmitted to external memory 6.

Column control circuit 8 is connected to CPU 4 and is provided for temporarily storing various control data for accommodating the document in set columns or blocks. The control data is also used for controlling the address control circuit 10. Further detail of column control circuit 8 will be described later in connection with FIG. 1.

Document memory 9 is controlled by the signal obtained from CPU 4 through address control circuit 10 and is provided for storing document data from buffer memory 7 in an organized manner, such that the letter codes, which are the constituents of the document data, are sequentially produced from buffer memory 7 and are sequentially deposited in element memories, which are the constituents of document memory 9. The data as stored in document memory 9 is provided to display control 11 for the display through CRT display 12, and also it is provided to print control 13 for printing the stored data by printer 14. Address control circuit 10 is controlled by CPU 4 and column control circuit 8 so as to designate address of the area in the document memory 9 to store the document data.

Display control circuit 11 is controlled by CPU 4 such that the letter code, which is the constituent of the document data, from document memory 9 is converted to a letter pattern. The converted letter pattern is applied to CRT display device 12 for the display of the letters on the screen 12a.

Print control circuit 13 is controlled by CPU 4 such that the letter code from document memory 9 is converted to a letter pattern for being printed on a printing paper.

In FIG. 1, column control circuit 8 and document memory 9 are shown in detail. Document memory 9 has a plurality of memory elements aligned in two orthogonal directions (i.e., horizontal and vertical), each memory element being capable of storing one letter code. To simplify the description, it is assumed that document memory 9 has 132 memory elements (twelve memory elements in the horizontal direction and eleven memory elements in the vertical direction) corresponding to the 132 memory element positions on the screen 12a, each memory element being capable of storing one letter code. In document memory 9, twelve columns are designated as A, B, C, ..., and L, and eleven lines are designated as 1, 2, 3, ..., and 11. Therefore, one memory element can be specified by the line number and column name, such as "3E". It is further assumed that, at present, the H-boundary 32a extends between memory elements "5A" and "5L", and the V-boundary 31a extends between memory elements "1F" and "4F" so as to define blocks 21 and 22 on both sides thereof and the V-boundary 32a extends between memory elements "5A" and "5L" so as to define blocks 23 and 24 on both sides thereof. Accordingly, block 21 occupies a rectangular area in document memory 9 surrounded by memory elements "1A", "1F", "4A" and "4F". Similarly, block 22 is surrounded by memory elements "1G", "1L", "4G" and "4L"; block 23 is surrounded by memory elements "6A", "6C", "11A" and "11C"; and block 24 is surrounded by memory elements "6E", "6L", "11E" and "11L".

The address for the memory elements used for setting the V-boundaries 31a and 31b and H-boundary 32a are generated from CPU 4 and are stored in V-boundary buffer 8a and H-boundary buffer 8b, respectively, and in turn, are applied to column area calculation circuit 8c. According to the example shown in FIG. 1, V-boundary buffer 8a stores addresses "1F", "2F", "3F", "4F", "6D", "7D", "8D", "9D", "10D" and "11D", representing the memory elements aligned along the V-boundaries, and H-boundary buffer 8b stores addresses "5A", "5B", "5C", "5D", "5E", "5F", "5G", "5H", "5I", "5J", "5K" and "5L", representing the memory elements aligned along the H-boundary.

Column area calculation circuit 8c receives from CPU 4 data representing the area to be occupied in the document memory 9, as well as the address data of the V- and H-boundaries from buffers 8a and 8b. Using the received data, column area calculation circuit 8c calculates column or block areas surrounded by the V- and H-boundaries, and produces address data representing the calculated column or block areas to column buffer 8d. Thus, column area calculation circuit 8c divides the document memory 9 into a plurality of columns or blocks, each column or block having a plurality of lines. Also different priorities are assigned to the columns or blocks such that the column or block located in the top row, left end has the highest priority, and the priorities are assigned from left to right, and then in the second row, and so on. Column buffer 8d stores addresses of opposite end memory elements of each line, i.e., address data representing the left-end memory element and the right-end memory element of each line in a column or block and the same for the following columns or blocks in the order of columns or blocks having a higher priority Therefore, according to the example shown in FIG. 1, column buffer 8d stores the following address data: "1A", "1E", "2A", "2E", "3A", "3E", "4A", "4E", "1G", "1L", "2G", "2L", "3G", "3L", "4G", "4L", "6A", "6C", "7A", "7C", "8A", "8C", "9A", "9C", "10A", "10C", "11A", "11C", "6E", "6L", "7E", "7L", "8E", "8L", "9E", "9L", "10E", "10L", "11E" and "11L".

The address data representing the left-end memory elements and the right-end memory elements as stored in column buffer 8d are sequentially applied in response to the output of letter counter 8i to each of an input inhibit column calculation circuit 8e and a letter number calculation circuit 8f. Also, the address data representing the left-end memory elements are sequentially applied to comparator 8h.

In response to the depression of the input inhibit column key K6, CPU 4 detects the position of the cursor in the screen, and provides an address data representing the position of the detected cursor to the input inhibit column calculation circuit 8e which also receives the address data representing the left-end memory elements and the right-end memory elements from column buffer 8d. Then, the input inhibit column calculation circuit 8e detects which column or block the cursor is located and provides all the address data representing the left-end memory elements and the right-end memory elements for the detected column or block. According to the example, it is assumed that the cursor is located in block 23 so that block 23 is designated as an input inhibit column, or a block to be skipped, in which no document data will be inputted. Therefore, input inhibit column calculation circuit 8e provides to the input inhibit column buffer 8g the address data representing the left-end memory elements of column 23, i.e., "6A", "7A", "8A", "9A" "10A" and "11A", which are applied to comparator 8h.

In comparator 8h, the address data representing the left-end memory elements sequentially applied from column buffer 8d are compared, one at a time, with the address data stored in the input inhibit column buffer 8g to detect address data from column buffer 8d which are identical with any one of the address data in the input inhibit column buffer 8g representing the left-end memory elements of the column or block to be skipped. If the address data from column buffer 8d is not identical with any one of the address data in buffer 8g, that address data passes through the comparator 8h and is applied to address control 10. If, on the contrary, the address data from column buffer 8d is identical with one of the address data in buffer 8g, comparator 8h prevents that address data from being further transmitted to address control 10.

Letter number calculation circuit 8f calculates, using the address data representing the left-end memory elements and the right-end memory elements from, column buffer 8d, the maximum number of the letters that can be fit in a line in the column or block. The the calculated number is applied to letter counter 8i so that the counter is set with the calculated number and is ready to count down each time the letter is inputted, for example, by the key depression. When counter 8i counts down to "0" after a number of letters are inputted, an automatic return is effected within the column or block, and then, for counting the maximum number of the letters of the next line, control signals are applied to column buffer 8d and comparator 8h.

Address control circuit 10 counts up the address one-by-one, from the address of the left-end memory element as obtained from comparator 8, in response to the letter transfer signal applied from CPU 4, thereby calculating the address. The calculated address is applied to document memory 9 which stores the letter code produced from buffer memory 7 at a memory element identified by the address from address control circuit 10. Then, the stored letter code is used in the display control circuit 11 and the print control circuit 13.

Figures 6, 6A:
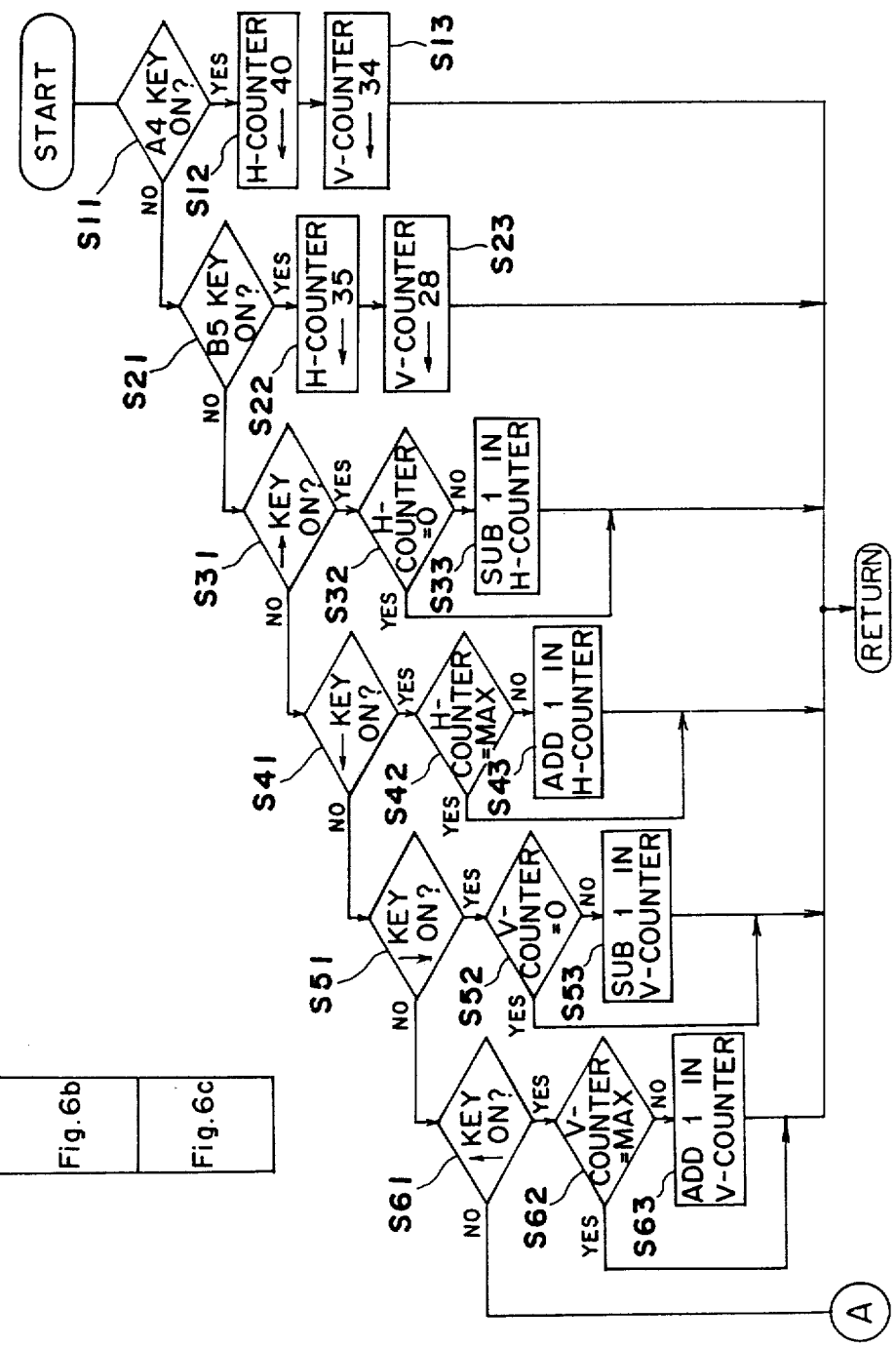
FIGS. 6a, 6b and 6c, taken together as shown in FIG. 6, illustrate a flow chart showing an operation for the column or block editing system.
Figure 6B:
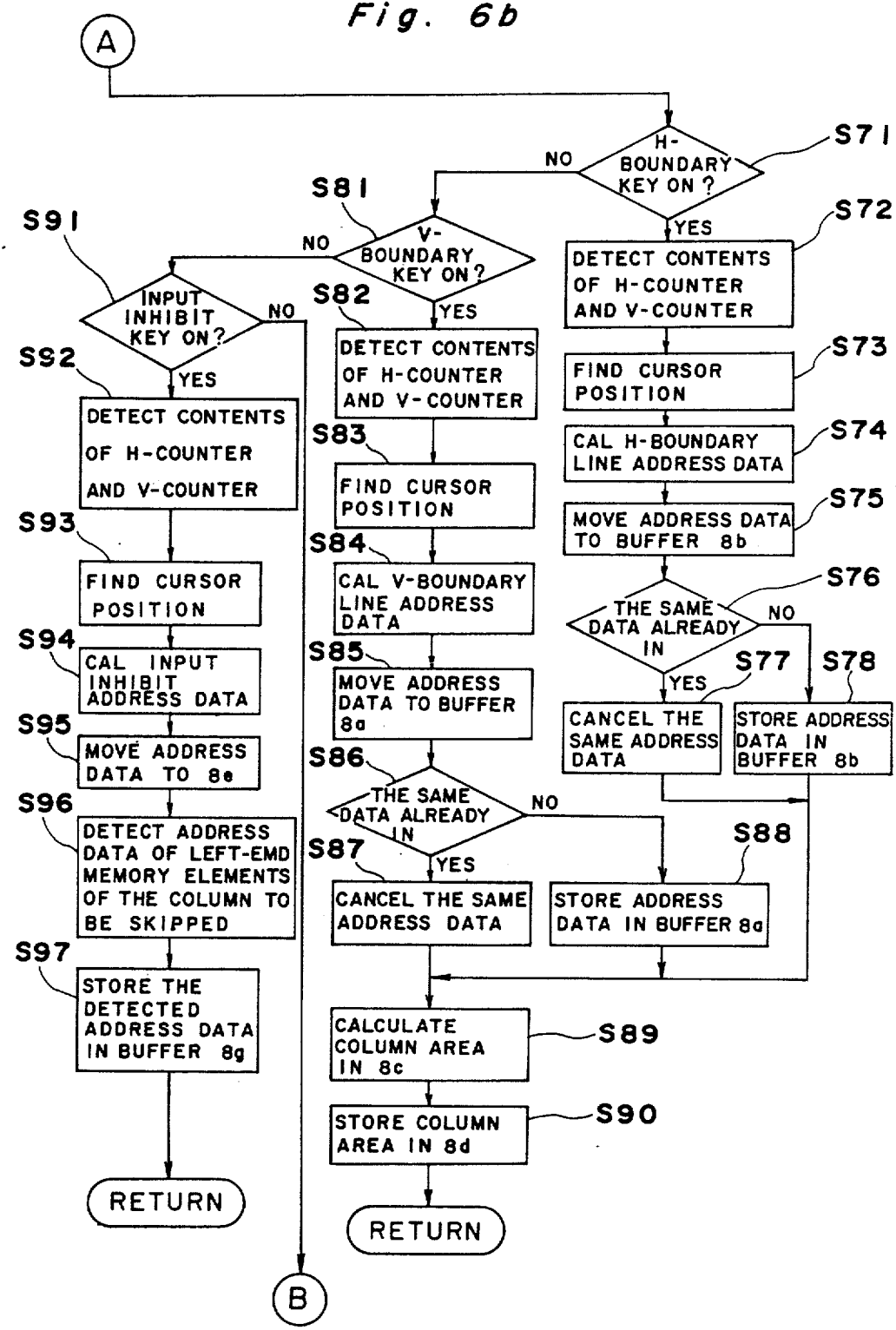
Figure 6C:
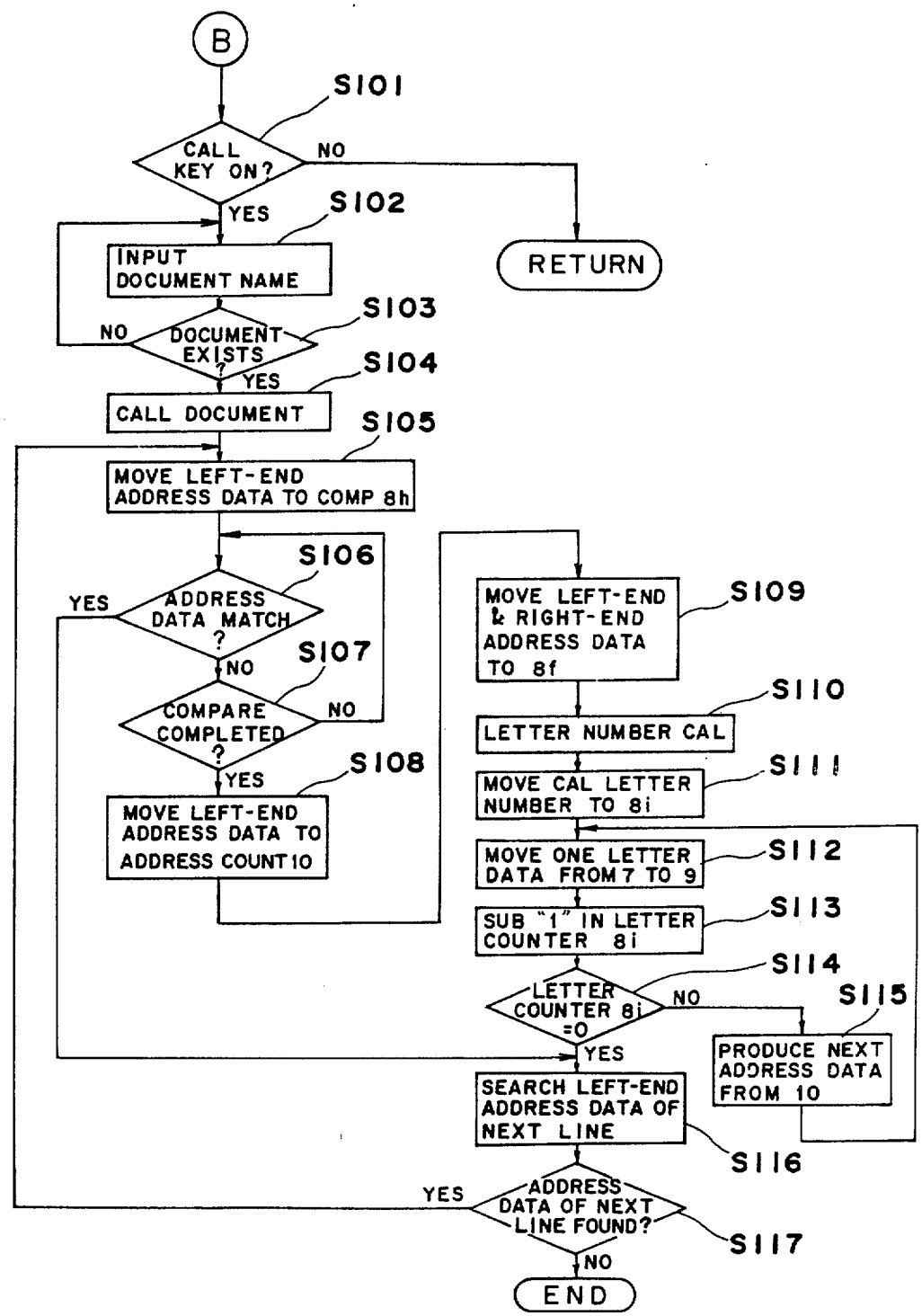

Referring to FIGS. 6a, 6b and 6c, a flow chart for the column or block editing system used in the word processor according to the present invention is shown.

Before carrying out the column or block edition, it is necessary to determine the paper size format of the document. At step S11, it is detected whether key K4 representing the A4 size paper is depressed. If key K4 is depressed, the program goes to step S12 at which the H-counter for counting the cursor movement in the horizontal direction is set with "forty", and at step S13, the V-counter for counting the cursor movement in the vertical direction is set with "thirty four". Then, the program returns to start.

At step S21, it is detected whether key K5 representing the A5 size paper is depressed. If key K5 is depressed, the program goes to step S22 at which the H-counter is set with "thirty-five", and at step S23, the V-counter is set with "twenty-eight". Then, the program returns to start.

After the format for the paper size is set, the cursor is moved, using cursor keys K7–K10, so as to set boundaries. At step S31, it is detected whether the cursor movement key K10 is depressed for moving the cursor to the right. If key K10 is depressed, the program goes to step S32 at which it is detected whether the H-counter is already counted down to zero, meaning that the cursor is already shifted to the most right-hand side boundary within the selected paper size. If the H-counter is not zero, the content of the H-counter is subtracted by "1" (step S33) to move the cursor to the right by one space and, thereafter, the program returns.

At step S41, it is detected whether the cursor movement key K9 is depressed for moving the cursor to the left. If key K9 is depressed, the program goes to step S42 at which it is detected whether the H-counter is already counted up to the maximum previously set at step S12 or S22, meaning that the cursor is already shifted to the most left-hand side boundary within the selected paper size. If the H-counter is not at the maximum, the content of the H-counter is added by "1" (step S43) to move the cursor to the left by one space and, thereafter, the program returns.

At step S51, it is detected whether the cursor movement key K8 is depressed for moving the cursor downwardly. If key K8 is depressed, the program goes to step S52 at which it is detected whether the V-counter is already counted down to zero, meaning that the cursor is already shifted to the bottom side boundary within the selected paper size. If the H-counter is not zero, the content of the V-counter is subtracted by "1" (step S53) to move the cursor downwardly by one space and, thereafter, the program returns.

At step S61, it is detected whether the cursor movement key K7 is depressed for moving the cursor upwardly. If key K7 is depressed, the program goes to step S62 at which it is detected whether the V-counter is already counted up to the maximum previously set at step S13 or S23, meaning that the cursor is already shifted to the top side boundary within the selected paper size. If the V-counter is not at the maximum, the content of the V-counter is added by "1" to move the cursor upwardly by one space and, thereafter, the program returns.

In order to define the columns or blocks, it is necessary to depict H-boundary line(s) and/or V-boundary line(s). To make an H-boundary, first, the cursor is moved, using cursor movement keys K7–K10, to a position where the H-boundary should be extended. Then, upon depression of the H-boundary key K1, the program advances from step S71 to step S72 at which the contents of the H-counter and V-counter are detected so as to find the position of the cursor when the H-boundary key K1 is depressed. Then, at step S74, the address data of the memory elements aligned horizontally in both directions from the cursor position are calculated and are transferred to H-boundary buffer 8b (step S75). According to the preferred embodiment, the H-boundary always extends completely across the document memory 9. Then, at step S76, it is detected whether the same address data are already stored in H-boundary buffer 8b. If the same data is already stored in H-boundary buffer 8b, the address data transferred to H-boundary buffer 8b are cancelled and, at the same time, the same address data as stored in H-boundary buffer 8b are also cancelled (step S77). This step is provided to erase once depicted horizontal line by depressing the H-boundary key for the second time with the cursor being located on the horizontal line already depicted. If the same data is not stored in H-boundary buffer 8b, the address data transferred to H-boundary buffer 8b are stored therein (step S78). Thereafter, the program goes to step S89.

Next, to make a V-boundary, first, the cursor is moved, using cursor movement keys K7–K10, to a position where the V-boundary should be extended.

Then, upon depression of the V-boundary key K2, the program advances from step S81 to step S82 at which the contents of the H-counter and V-counter are detected so as to find the position of the cursor when the V-boundary key K2 is depressed. Then, at step S84, the address data of the memory elements aligned vertically and extending downwardly from the cursor position are calculated and are transferred to V-boundary buffer 8a (step S85). Then, at step S86, it is detected whether the same address data are already stored in V-boundary buffer 8a. If the same data is already stored in V-boundary buffer 8a, the address data transferred to V-boundary buffer 8a are cancelled and, at the same time, the same address data as stored in V-boundary buffer 8a are also cancelled (step S87). This step is provided to erase once depicted vertical line by depressing the V-boundary key K2 for the second time with the cursor being located on the vertical line already depicted. If the same data is not stored in V-boundary buffer 8a the address data transferred to V-boundary buffer 8a are stored therein (step S88). For example, the V-boundary 31a (FIG. 1) is depicted in the following manner. First, the cursor is moved to a position "1F" and then, V-boundary key K2 is depressed to draw a vertical line extending from "1F" to "11F". Then, the cursor is moved to "6F" and then, V-boundary key K2 is depressed to erase the vertical line between "6F" and "11F". The result is such that the vertical line remains between "1F" and "5F". Thereafter, the program goes to step S89.

Then, each time the H-boundary or V-boundary is depicted in steps S71–S78 or in steps S81–S88, the column or block area defined by the boundaries is calculated using the paper size data from CPU 4 at column area calculation circuit 8c in a manner described above (step S89). Then, at step S90, column buffer 8d stores address data representing the left-end memory element and the right-end memory element of each line of the detected column or block. Thereafter, the program returns.

Next, to denote an input inhibit column that should be skipped and not filled with the document, first, the cursor is moved, using cursor movement keys K7–K10, to a position inside the column or block to be skipped. Then, upon depression of the input inhibit column key K6, the program advances from step S91 to step S92 at which the contents of the H-counter and V-counter are detected so as to find the address data representing the position of the cursor when the input inhibit column key K6 is depressed (step S93).

Then, at step S94, the detected address data representing the cursor position is applied to the input inhibit column calculation circuit 8e to calculate the input inhibit column address data, and at step S95, all the address data representing the left-end memory elements and the right-end memory elements of the column or block to be skipped are transferred from column buffer 8d to input inhibit column calculation circuit 8e. Then, at step S96, the input inhibit column calculation circuit 8e produces the address data representing only the left-end memory elements of the column or block to be skipped, and at step S97, thus produced address data of the column or block to be skipped is stored in input inhibit column buffer 8g. Thereafter, the program returns.

Next, the document filling operation in each column or block will be explained. The document filling in the columns or blocks can be carried out either by direct typing or by calling an already typed document. The description will be directed to the later case.

When the call key K3 is depressed, the program advances from step S101 to step S102 at which the document name to be called is specified and entered. At this stage, CPU 4 controls display control 11 to produce a prompt "Document Name ?". In response to this, the operator types the document name of the document to be filled in the columns or blocks. Then, at step S103, it is detected whether the entered document exists in the external memory device. If not, then the program returns to step S102 to re-enter the document. If the document exists, the program goes to step S104 to call and get the document as specified such that the document is temporarily stored in buffer memory 7.

Then, at step S105, the address data representing the left-end memory element as stored in column buffer 8d is transmitted to comparator 8h, and at step S106, the address data is compared with each address data stored in buffer 8g. If the address data obtained from column buffer 8d matches with one of the address data stored in buffer 8g the program jumps from step S106 to step S116 for skipping the line thereby filling no letter in the line. On the contrary, if the address data obtained from column buffer 8d matches with no address data stored in buffer 8g, the program goes to step S108 at which the address data used in the comparator 8h is transferred to address control circuit 10 and, at step S109, the same address data representing the left-end memory element and the address data representing the opposing right-end memory element of the same line is transferred from column buffer 8d to letter number calculation circuit 8f at which the number of letters that can be fitted in the line is calculated (step S110). The calculated letter number is transferred to letter counter 8i so that the letter counter 8i is set with a number equal to the calculated letter number (S111).

Then, at step S112, one letter from buffer memory 7 is transferred to text memory 9 and deposited at the left-end memory element specified by the address data transferred to address control 10 from comparator 8h. Thereafter, the letter counter 8i is decreased by one (step S113), and then, it is detected whether the letter counter 8i has been counted down to zero. If not, then the program goes to step S115 so as to make address control circuit 10 to produce next address data of a memory element located to the right of the previous memory element. Then, at step S112, another letter from buffer memory 7 is transferred to text memory 9 and deposited at the memory element as specified. Then, again the letter counter 8i is decreased by one. This is repeated until the letter counter 8i is decreased to zero, i.e., when the line is filled with the letters transferred from buffer memory 7.

Thereafter, the program goes to step S116 at which the address data representing the left-end memory element of the next line as stored in column buffer 8d is searched. If there is no such an address data stored in column buffer 8d, the program goes from step S117 to END. However, if the address data of the next line still exists, the program returns to step S105 so as to fill the next line with the letters transferred from buffer memory 7 in a similar manner described above.

In this manner, the lines in the columns or blocks are filled with letters sequentially transferred from buffer memory 7 in the line order listed in column buffer 8d but the lines listed in buffer 8g are skipped. Therefore, the columns or blocks are filled from the top row left column or block and, sequentially to the next column or block located to the right. When the columns or blocks in the top row are filled, the second row, left column or block is filled, and so on.

When none of the keys K1-K10 are depressed, the program merely goes around the loop of steps S11, S21, S31, S41, S51, S61, S71, S81, S91, S101, but when any one of the key is depressed, the program corresponding to the depressed key is carried out. When call key K3 is depressed to carry out steps S102-S117, and when all the lines in the columns or blocks are filled with the document from buffer memory 7, the column or block editing operation completes to end the flow chart shown in FIGS. 6a, 6b, and 6c.

In order to markedly depict the V- and H-boundaries, e.g., 31a, 31b and 32a, such lines may be hatched or, alternatively, they may be highlighted. Also, the column or block to be skipped may be hatched or highlighted.

Although the present invention has been fully described with reference to a preferred embodiment, many modifications and variations thereof will now be apparent to those skilled in the art, and the scope of the present invention is therefore to be limited not by the details of the preferred embodiment described above, but only by the terms of appended claims.

What is claimed is:

1. An editing system for use in a word processor comprising:
    letter code producing means for sequentially producing letter codes;
    document memory means having a plurality of memory elements aligned in vertical and horizontal directions, each memory element having a capacity of storing one letter code;
    vertical and horizontal boundary setting means for setting vertical and horizontal boundaries within said document memory means to divide said document memory means into a plurality of blocks, each block having a plurality of rows of text, and different, ordered priorities being assigned to said blocks;
    row address storing means for storing row addresses from top to bottom in each of said blocks and in the order of blocks having a higher priority;
    address data producing means for sequentially producing address data of said memory elements in each row and in the order of rows as stored in said storing means;
    control means for controlling depositing of said letter codes from said letter code producing means to said document memory means, said control means being operatively connected to at least said address data producing means and depositing the letter codes in said document memory means in response to said address data produced from said address data producing means, said control means further determining when a last row address for a block is filled by deposited letter code and when at least one subsequent letter code remains undeposited and thereafter beginning depositing of the at least one subsequent letter code in a first row address of a block having next priority to the filled block; and
    inhibit setting means for setting a block to be skipped in depositing the letter codes, said inhibit setting means comprising;
    means for specifying a block to be skipped,
    means for holding row addresses of the specified block, and
    comparing means for comparing said row address obtained from said row address storing means with said row addresses held in said row address holding means, said comparing means thereafter causing said address data producing means to produce said row address when said row address obtained from said row address storing means is absent from said row addresses held in said row address holding means, and for causing said address data producing means to fail to produce said row address when said row address obtained from said row address storing means is found in said row addresses held in said row address holding means.

2. The editing system as claimed in claim 1, wherein said row addresses as stored in said row address storing means includes addresses of a beginning and end of each row.

3. The editing system as claimed in claim 1, further comprising inhibit setting means for setting a column to be skipped in depositing the letter codes.

* * * * *